(12) United States Patent
Arnold et al.

(10) Patent No.: US 9,315,257 B2
(45) Date of Patent: Apr. 19, 2016

(54) CONTROL ROD DEVICE

(71) Applicant: ZF Friedrichshafen AG, Friedrichshafen (DE)

(72) Inventors: Uwe Arnold, Kassel (DE); Matthias Muller, Kassel (DE); Jeurgen Goette, Vellmar (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 633 days.

(21) Appl. No.: 13/862,565

(22) Filed: Apr. 15, 2013

(65) Prior Publication Data
US 2014/0064914 A1    Mar. 6, 2014

(30) Foreign Application Priority Data

Apr. 25, 2012  (DE) .......... 10 2012 206 755

(51) Int. Cl.
| | |
|---|---|
| *B64C 27/51* | (2006.01) |
| *B64C 11/36* | (2006.01) |
| *B64C 11/12* | (2006.01) |
| *B64C 11/28* | (2006.01) |
| *B64C 11/32* | (2006.01) |
| *B64C 27/54* | (2006.01) |

(52) U.S. Cl.
CPC ............... *B64C 11/32* (2013.01); *B64C 27/54* (2013.01)

(58) Field of Classification Search
CPC ...... B64C 27/54; B64C 27/52; B64C 27/605; B64C 11/32; F05D 2260/79
USPC .......... 416/104, 106, 163–164, 168 R, 134 R, 416/134 A, 23; 415/1
See application file for complete search history.

(56) References Cited

U.S. PATENT DOCUMENTS

| | | | | | |
|---|---|---|---|---|---|
| 1,266,061 | A | * | 5/1918 | Scoville ........................ | 285/261 |
| 2,350,482 | A | * | 6/1944 | Venditty ....................... | 384/203 |
| 2,478,660 | A | * | 8/1949 | Keahey ........................ | 384/211 |
| 2,498,060 | A | * | 2/1950 | Allimann ...................... | 248/357 |
| 2,960,168 | A | * | 11/1960 | Emmerson et al. ......... | 244/17.13 |
| 2,978,037 | A | * | 4/1961 | Focke ............................ | 416/40 |

(Continued)

FOREIGN PATENT DOCUMENTS

| | | |
|---|---|---|
| DE | 28 11 678 A1 | 9/1979 |
| DE | 32 25 571 C2 | 7/1984 |

(Continued)

OTHER PUBLICATIONS

German Search Report Corresponding to 10 2012 206 755.8.

*Primary Examiner* — Thai Ba Trieu
(74) *Attorney, Agent, or Firm* — Davis & Bujold, P.L.L.C.; Michael J. Bujold

(57) ABSTRACT

A control rod configuration for adjusting a position of a rotor blade of a helicopter. The control rod configuration includes a control rod which has a bearing eye, adjacent the swash plate, which is penetrated by an axle shaft which has a bearing supported by a bearing bracket. The control rod configuration, which can be simply constructed and is less susceptible to malfunction, has an eccentric with its pivotable bearing in the bearing bracket and which is provided between the bearing bracket and the bearing eye. In addition, a method in which a rotor blade of a helicopter has an assigned control rod which is supported by an axle shaft with a bearing in the bearing bracket which is mounted to the swash plate so as to enable adjustment of the control rod by pivoting the axle shaft during flight.

8 Claims, 2 Drawing Sheets

(56) References Cited

U.S. PATENT DOCUMENTS

| | | | |
|---|---|---|---|
| 3,030,134 A * | 4/1962 | Gair | 403/75 |
| 3,116,539 A * | 1/1964 | Evans et al. | 384/206 |
| 3,139,937 A * | 7/1964 | Derschmidt et al. | 416/105 |
| 3,415,324 A | 12/1968 | Austin, Jr. | |
| 3,825,983 A * | 7/1974 | McCloskey | 29/898.045 |
| 4,097,163 A * | 6/1978 | Dubuque | 403/274 |
| 4,498,842 A | 2/1985 | Fischer et al. | |
| 4,850,543 A * | 7/1989 | Raasch et al. | 242/470 |
| 5,042,319 A | 8/1991 | Hobock et al. | 74/570.3 |
| 5,431,540 A | 7/1995 | Doolin et al. | |
| 5,511,944 A | 4/1996 | Ide et al. | |
| 6,152,692 A * | 11/2000 | Aubry | 416/23 |
| 7,438,492 B2 | 10/2008 | Naudet et al. | |
| 8,834,128 B2 * | 9/2014 | Kuntze-Fechner et al. | 416/230 |
| 8,858,178 B2 * | 10/2014 | Kuntze-Fechner | 416/134 A |
| 2006/0133890 A1 | 6/2006 | Etoile et al. | |
| 2015/0060597 A1 * | 3/2015 | Sutton et al. | 244/17.25 |
| 2015/0093059 A1 * | 4/2015 | Davis | 384/206 |

FOREIGN PATENT DOCUMENTS

| | | | |
|---|---|---|---|
| DE | 3913195 A1 * | 11/1989 | F01D 17/16 |
| DE | 29610166 U1 * | 1/1997 | B64C 11/32 |
| DE | 60 2004 000 201 T2 | 8/2006 | |
| DE | 60 2005 002 444 T2 | 6/2008 | |
| DE | 10 2009 001 393 A1 | 9/2010 | |
| EP | 0 027 468 B1 | 7/1983 | |
| GB | 1387219 A * | 3/1975 | B64C 27/54 |
| GB | 2 028 952 A | 3/1980 | |
| WO | WO 2009010644 A2 * | 1/2009 | B64C 27/54 |
| WO | WO 2010068194 A1 * | 6/2010 | B64C 27/54 |

* cited by examiner

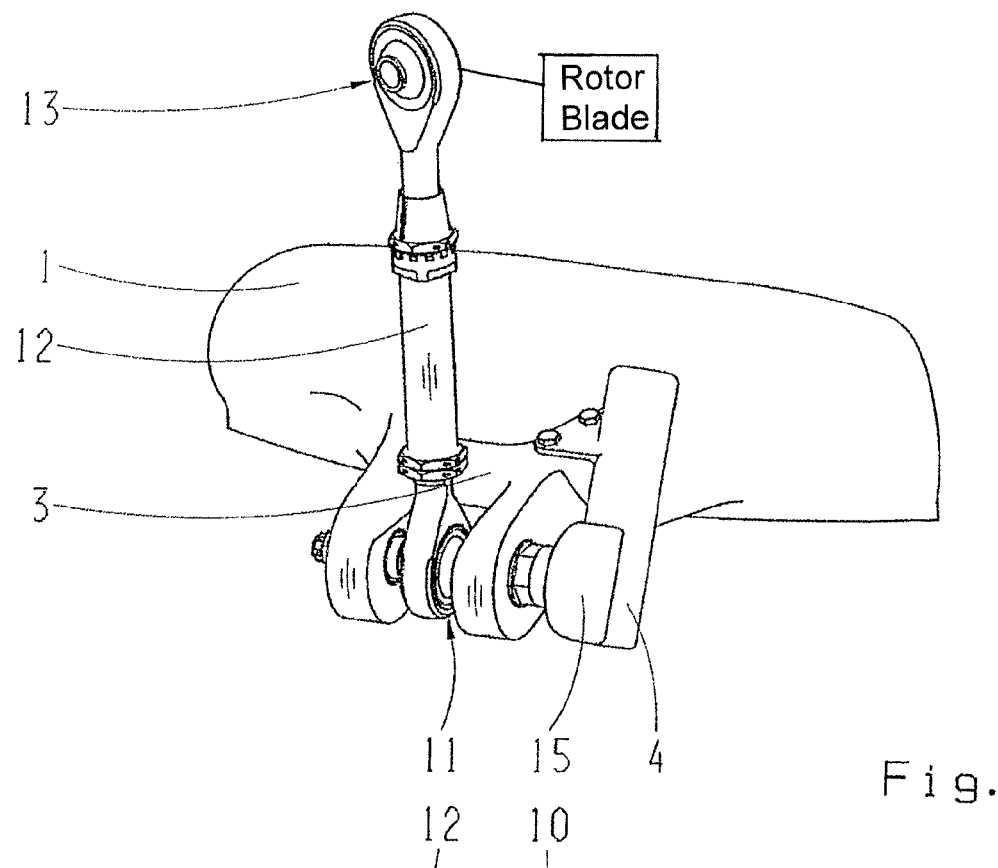
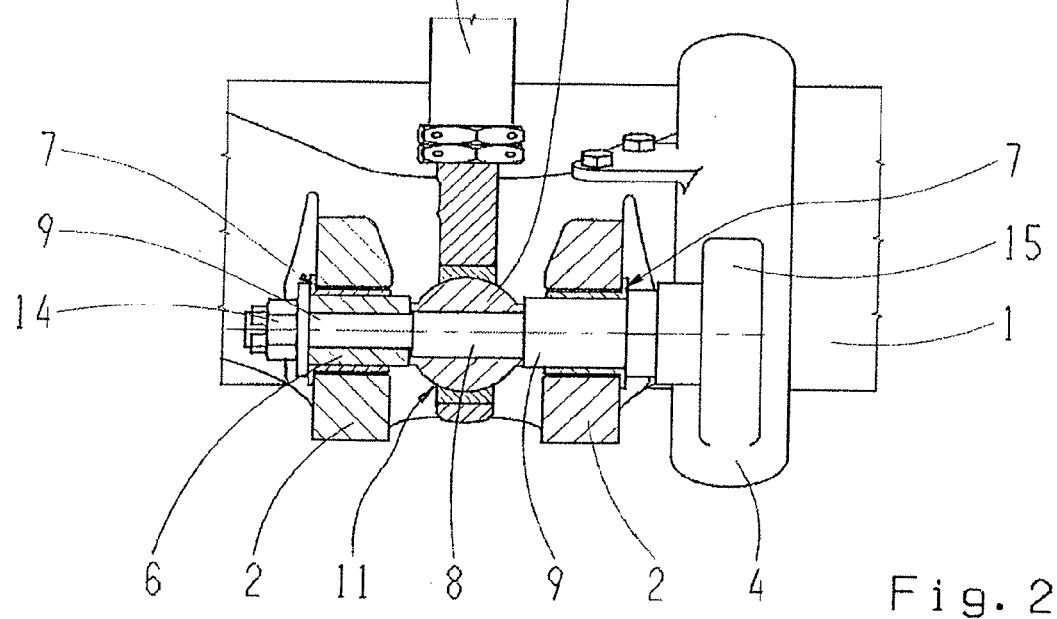

CONTROL ROD DEVICE

This application claims priority from German patent application serial no. 10 2012 206 755.8 filed Apr. 25, 2012.

BACKGROUND OF THE INVENTION

Due to their system design, helicopters suffer from high levels of vibration, which are caused by rotation of the rotor blades. For the reasons of construction strength and to reduce the stress on material and the crew, certain limit values for the 1/Rev vibration (aerodynamic imbalance). For this purpose, tracking flights are executed with a measuring system to calculate the actual condition. The required adjustment of the control rod is hereby determined between the swash plate and the respective rotor blade to minimize the imbalance. The helicopter needs to land each time the control rods are adjusted because this adjustment can only be executed the rotor is stationary. After each adjustment, the condition is checked during another flight, wherein the procedure needs to be repeated until the required limit values are met. This procedure is called Rotor Track & Balance (RT&B).

Since however the aerodynamic imbalances are flight condition dependent, the method itself, even after a successful completion of the RT&B procedure, is just a compromise. This can be eliminated by continuous adjustment of the control rods during the flight (In-Flight Tuning). The respective steps and the suitable control rod configurations are for instance known through U.S. Pat. No. 5,511,944; through DE 32 25 571 C2 or DE 10 2009 001 A1, respectively. The last-mentioned German patent application is also considered to be a generic type of the present invention.

The described control rod configuration for adjusting the rotor blades of a helicopter has a control rod with two bearing eyes at the end and an adjustable length range between the bearing eyes. The control rod, at its rotor blade ends, is connected by way of one bearing eye with the rotor blade and at the other end is connected by way of the other bearing eye with the swash plate. The distance between the two bearing eyes can be altered within an adjustment length range by means of a drive positioned in the adjustment length range during the flight. To adjust the length of the control rod, an electromotor and a transmission are provided as the drive in the adjustment area. The integration of the additional parts into the control rod is complex, susceptible to failure, and costly. The integration further increases the weight of the rotor blades that are rotating with control rods.

SUMMARY OF THE INVENTION

The present invention is based on the objective of presenting a control rod configuration which has a simple and robust construction. Furthermore, the present invention will show a method of adjusting the associated control rods of each rotor blade of the helicopter.

The inventive control rod configuration has, however, the known art of a control rod with a bearing eye at the swash plate side which is penetrated by an axle body which has a bearing in a bearing bracket at the swash plate side. This bearing bracket at the swash plate side is usually attached directly at the swash plate. The invention is characterized by an eccentric which has a pivotable bearing in the bearing bracket at the swash plate and which is positioned between the bearing block and the bearing eye at the control rod side.

The inventive embodiment provides the possibility of adjusting the length of the control rod during the flight not within the control rod, but mainly in the area of the bearing at the swash plate side. In particular, the drive for adjusting the control rod can be positioned outside of the control rod so that the control rod itself can be designed slim and have a reduced weight. Beside the inventive adjustment by means of an eccentric drive, which allows in-flight alteration, the control rod can also be adjusted in length by way of the known art so as to execute Rotor Tracking & Balancing. The actual length of the control rod can hereby remain constant. Just the effective length between the bearing at the swash plate side and the opposite end of the control rod is changed through the invented eccentric.

Generally, the control rod at the swash plate side has a pivotable bearing, meaning on a ball joint body which is penetrated with the previously mentioned axle body. The inventive eccentric is hereby designed in such a manner that a bearing surface, which is created by the ball joint body for the control rod, is eccentric with reference to the bearing bracket and the axle body is connected to a control drive. The control drive rotates the axle body and enables hereby, due to the eccentric, a change of the position of the control rod in the area of the bearing at the swash plate side, relative to the bearing bracket and thus a change of the effective length of the control rod. The distance between the bearing bracket and the bearing eye at the rotor blade side is therefore able to be changed by shifting the pivot point of the control rod at the swash plate side. Any type drive can be applied as a control drive, for instance an electric motor, where its output shaft is connected in a rotationally fixed manner with the axle body.

The eccentric can be designed as an eccentric section of the axle body which is accommodated in the bearing eye of the control rod at the swash plate side. This eccentric section penetrates generally the previously mentioned ball joint body.

Alternatively, the eccentric can also be designed in a way that the previously mentioned ball joint body has a bore where its central longitudinal axis is positioned eccentric to the central longitudinal axis of a bearing bore of the bearing bracket, whereby the axle body is connected in a rotationally fixed manner in the bore of the ball joint body.

In accordance with another aspect, the present invention exhibits a method of adjusting the control rods which are each assigned to a rotor blade of a helicopter, where the control rods are supported by an axle body in a bearing bracket which is mounted at a swash plate. In accordance with the invention, adjustment of the control rod, meaning the change of the length between the bearing support at the swash plate side of the control rod and its mounting point at the rotor blade side takes place through pivoting of the axle body in the already previously described manner.

BRIEF DESCRIPTION OF THE DRAWINGS

Additional details and advantages of the present invention result from the following description of two embodiment examples, in conjunction with the drawings. These show:

FIG. 1 a perspective side view of an example embodiment with parts of a swash plate of a helicopter, FIG. 2 a longitudinal sectional view of the example embodiment as presented in FIG. 1.

DETAILED DESCRIPTION OF THE PREFERRED EMBODIMENTS

Figure 3:
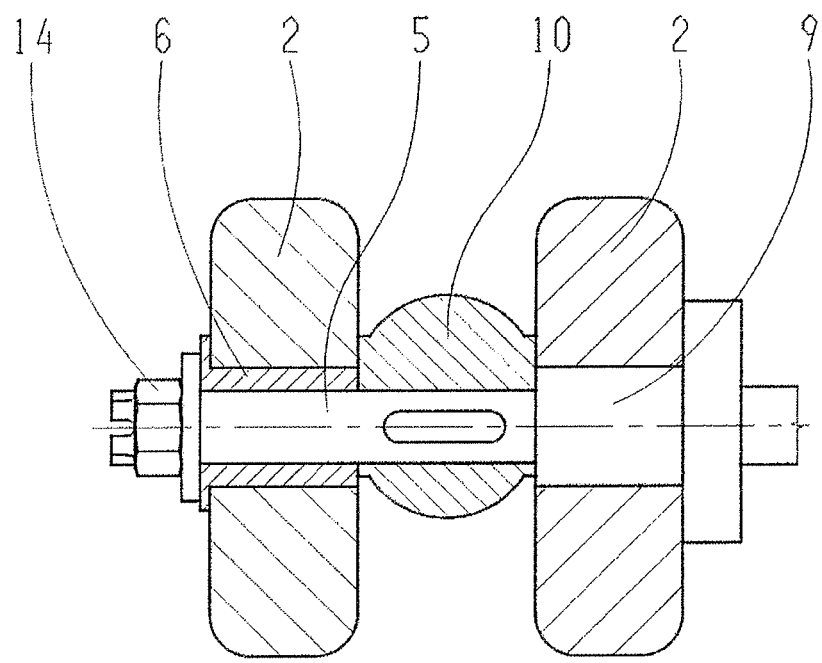
FIG. 3 a longitudinal sectional view of an alternative example embodiment.

In the drawing, an example embodiment of the inventive control rod configuration is revealed. It shows a swash plate which is marked with the reference character 1 of a helicopter which is not shown here. The swash plate 1 carries two bearing brackets 2 which are mounted to the swash plate 1 via a bearing bracket base 3, where the bearing bracket base 3 supports a drive bracket 4 which is laterally adjacent one of the bearing brackets 2 and which is bolted to the swash plate 1.

The bearing brackets 2 are passed through in conventional manner by an axle body 5. This axle body 5 is accommodated in the bearing brackets 2 by means of a bearing sleeve 6 which are accommodated within the bearing bores 7 of the bearing brackets 2 which are concentric with respect to each other. Between the bearing brackets 2 is an eccentric section 8 which has a circular cross section, like the bearing sections 9 of the axle body 5 provided in the bearing sleeves 6, however, its central longitudinal axis is offset in reference to the central longitudinal axis of the bearing sections 9 or rather the bearing bores 7. The eccentric section 8 passes through a ball and socket joint body 10, which is arranged concentrically with the eccentric section 8, and which is accommodated by the swash plate side bearing eye 11 that is formed as part of the control rod 12. The control rod 12 is illustrated in FIG. 1 and has sections with threaded engagements which can be screwed and locked together with lock nuts for Rotor Tracking & Balancing so as to alter the basic length of the control rod 12, meaning the distance between the swash plate side bearing eye 11 and a rotor blade side bearing eye 13.

As FIG. 2 shows, the axle body 5 is screwed, on one side, by a fastening nut 14 to the associated bearing bracket 2, whereby, on the other side, the axle body 5 extends beyond the associated bearing bracket 2 and is accommodated in a drive enclosure 15 that is provided in the drive bracket, which encloses a not shown electric motor having an assigned transmission, and where its output shaft is connected in a rotationally fixed manner with the axle body 5.

The electric motor is activated so as to adjust the effective length of the control rod 12. Hereby, the axle body 5 is pivoted. By means of the eccentric design of the eccentric section 8, relative to the bearing bores 7 of the bearing brackets 12, the central longitudinal axis of the eccentric section 8 is lifted or rather lowered relative to the bearing brackets and therefore the length of the control rod 12 is effectively changed.

FIG. 3 explains an alternative example embodiment based on the essential components in FIG. 1. The components, which are the same as those in the previously described embodiment, are provided with the same reference characters. This example embodiment differs mainly by the fact that the ball joint body 10 has an eccentric bore and is positioned in a rotationally fixed manner on the axle body 5. This creates the inventive eccentric. The axle body 5 by itself is not eccentrically designed. Due to the eccentricity of the ball joint body 10 and during rotational movement of the axle body 5, the effective length of the control rod, meaning the distance between the central longitudinal axis of the axle body 5 and the central longitudinal axis of the rotor blade side bearing eye 13, is altered.

The present invention is not limited to the shown example embodiments. For instance, the axle body 5 in the embodiments of FIGS. 1 and 2 can be designed as two parts, where the first part is designed with a bearing section and an eccentric section 8 with a reduced diameter, which meshes at it's available end with the opposite bearing bracket and is kept there by a separate bearing cylinder, which is pivotably mounted in the other bearing bracket and axially fixed in reference to it. The ball joint body 10 can also be divided and surrounded by screwing the two parts together in the eccentric section 8, as is usual in connecting rods for crankshafts of gasoline engines.

REFERENCE CHARACTERS

1 Swash Plate
2 Bearing Bracket
3 Bearing Bracket Base
4 Drive Bracket
5 Axle body
6 Bearing Sleeve
7 Bearing Bore
8 Eccentric Section
9 Bearing Section
10 Ball Joint Body
11 Swash plate side bearing eye
12 Control Rod
13 Rotor blade side bearing eye
14 Fastening Nut
15 Drive

The invention claimed is:

1. A control rod configuration, for adjusting a rotor blade of a helicopter, comprising:
a control rod (12) having a swash plate side bearing eye (11), at one end, which is penetrated by an axle body (5), the swash plate side bearing eye of the control rod defining a longitudinal axis,
the axle body (5) being rotationally supported by a bearing in a bearing bracket (2) such that the axle body is rotatable in the bearing bracket about a rotational axis, and
an eccentric (8), which is pivotable in the bearing bracket (2), being arranged between the bearing bracket (2) and the swash plate side bearing eye (11), the eccentric having a central axis that is offset from the rotational axis of the axle body and is coaxial with the longitudinal axis of the swash plate bearing eye of the control rod.

2. The control rod configuration according to claim 1, wherein the eccentric (8) is constructed on the axle body (5).

3. The control rod configuration according to claim 1, wherein a ball joint body (10) has a bore and the axle body (5) passes through the bore in the ball joint body (10),
the ball joint body (10) is supported in a rotationally fixed manner by the axle body (5) to prevent relative rotation between the ball joint body and the axle body, and
the bore, in the ball joint body, defines a bore axis that is eccentric with respect to a central longitudinal axis of a bearing bore (7) of the bearing bracket (2).

4. A method of adjusting a control rod (12) which is connected to a rotor blade of a helicopter, the control rod (12) being supported by an axle body (5), and the axle body (5) being rotatably supported by a bearing in a bearing bracket (2) mounted to a swash plate (1), an eccentric (8), which is pivotable in the bearing bracket (2), being arranged between the bearing bracket (2) and a swash plate side bearing eye (11), the eccentric having a central axis that is offset from a rotational axis of the axle body (5) and is coaxial with a longitudinal axis of the swash plate bearing eye (11) of the control rod, the method comprising:
rotating the axle body (5), during flight of the helicopter, to adjust a position of the control rod (12).

5. A control rod configuration, for adjusting a rotor blade with respect to a swash plate of a helicopter, the control rod configuration comprising:
a control rod having a first bearing eye and a second bearing eye that are located at opposite ends thereof;

the control rod being connected, via the first bearing eye, to the rotor blade;

the second bearing eye rotatably receiving an eccentric member;

the eccentric member having a throughbore which defines an eccentric axis;

an axle body passes through the throughbore of the eccentric member and being connected to the eccentric member such that the eccentric member and the axle body are fixedly connected with one another;

a pair of brackets being supported by the swash plate and each of the pair of the brackets having a bearing bore, the bearing bores being aligned with one another and defining a central longitudinal axis, and the axle body being received within the bearing bores and rotationally supported by the pair of the brackets such that the axle body being rotatable, about the central longitudinal axis, with respect to the pair of the brackets and the swash plate; and a drive bracket being fixed to the swash plate and engaging with the axle body so as to rotationally drive the axle body about the central longitudinal axis, the eccentric axis that is defined by the throughbore in the eccentric member being offset from the central longitudinal axis defined by the bearing bores of the pair of the brackets such that the control rod being biased, with respect to the swash plate, by rotation of the axle body about the central longitudinal axis.

6. The control rod configuration according to claim 5, wherein the axle body is axially fixed such that the eccentric member is located axially between the pair of brackets and the drive bracket engages the axle body at a location spaced from the eccentric member.

7. The control rod configuration according to claim 5, wherein the eccentric axis is offset from the central longitudinal axis such that the first bearing eye is biased in a direction normal to the central longitudinal axis.

8. The control rod configuration according to claim 5, wherein the eccentric member is a ball which is rotatably received by a socket in the second bearing eye of the control rod.

* * * * *